United States Patent [19]

Lossner et al.

[11] Patent Number: 5,093,406

[45] Date of Patent: Mar. 3, 1992

[54] CURABLE HOT MELT ADHESIVES

[75] Inventors: Kevin S. Lossner, Monrovia; Yukihiko Sasaki, Claremont, both of Calif.

[73] Assignee: Avery Dennison Corporation, Pasadena, Calif.

[21] Appl. No.: 452,560

[22] Filed: Dec. 14, 1989

Related U.S. Application Data

[63] Continuation-in-part of Ser. No. 57,504, Jun. 3, 1987.

[51] Int. Cl.$^5$ .................... B32B 15/04; C08L 53/00; C08L 93/00; C08K 5/01
[52] U.S. Cl. .................... 524/483; 522/110; 524/271; 524/272; 524/274; 524/276; 524/476; 524/484; 524/486; 524/505; 428/355; 525/98; 525/193; 525/194
[58] Field of Search .............. 524/274, 271, 276, 476, 524/484, 508, 486, 272, 483; 428/355; 522/110; 525/98, 193, 194

[56] References Cited

U.S. PATENT DOCUMENTS

| | | | |
|---|---|---|---|
| 4,151,057 | 4/1979 | St. Clair et al. | 428/461 |
| 4,243,500 | 1/1981 | Glennon | 525/98 |
| 4,286,077 | 8/1981 | St. Clair et al. | 524/505 |
| 4,634,729 | 1/1987 | Pavlin et al. | 524/285 |
| 4,699,842 | 10/1987 | Jorgensen et al. | 428/355 |
| 4,822,653 | 8/1989 | Kaufman | 428/355 |
| 4,833,193 | 5/1989 | Sieverding | 428/355 |
| 4,835,217 | 5/1989 | Jorgensen | 525/93 |
| 4,857,594 | 8/1989 | Lakshmanan | 524/505 |
| 4,861,635 | 8/1989 | Carpenter et al. | 428/355 |

*Primary Examiner*—Herbert J. Lilling
*Attorney, Agent, or Firm*—Christie, Parket & Hale

[57] ABSTRACT

There are provided a pressure-sensitive adhesive which are free radical cured mixtures of at least one unsaturated elastomeric polymer and at least one organic additive which is substantially nonresponsive to action of free radicals and present in an amount sufficient to modify thr properties of the cured elastomeric polymer which mixture prior to cure has a viscosity of less than about 30 Pascal-seconds at a hot melt application temperature less thant 175° C.

1 Claim, No Drawings

CURABLE HOT MELT ADHESIVES

CROSS-REFERENCE TO RELATED APPLICATION

This application is a continuation-in-part of application Ser. No. 07/057,504, filed June 3, 1987, incorporated herein by reference.

BACKGROUND OF THE INVENTION

This invention is directed to multicomponent hot melt compositions which form pressure-sensitive adhesives upon cure at reduced energy requirements.

U.S. Pat. No. 3,973,788 to Pekko assigned to the common assignee of this invention and incorporated herein by reference, describes a label construction where the underside of a clear polyester facestock is printed with intelligent indicia which printing is subsequently coated with a pressure-sensitive adhesive. There is then added a release liner. In the construction, printing is protected from abrasion or chemical attack by the facestock. An application of such labels is the automotive industry where the label is applied to surfaces in the engine compartment. Commonly, the adhesive is pigmented to conform to or contrast the color of the substrate and/or enhance printing visibility.

The process for producing such labels is complex and expensive. First, the back side of the facestock is printed, then the adhesive is applied to the label from transfer tape constructions of highly pigmented solution adhesives. To date, only solution acrylic adhesives have proven commercially feasible for this application. After transfer lamination, the labels are die cut and the matrix stripped off.

More recently, a process has been developed where printing and adhesive coating may be accomplished in tandem. In this process it is possible to UV cure the adhesive. The process is much simpler, less time consuming, and eliminates the need for the additional release liner attendant to the use of transfer adhesives. To be useful in the process, the adhesives must be hot melt adhesives of low melt viscosity. For automotive applications, the adhesive must display high temperature motor oil resistance which, due to melt viscosity restrictions, must be achieved by cross-linking.

The present invention is therefore directed to curable low viscosity pressure-sensitive adhesive formulations which are adaptive to application by hot melt processes which include printing and upon cure form pressure-sensitive adhesives useful for automotive applications especially where oil resistance is required.

SUMMARY OF THE INVENTION

According to the present invention, there are provided pressure-sensitive adhesive compositions which comprise in combination at least one unsaturated elastomeric polymer capable of undergoing cross-linking reactions in the presence of free radicals preferably generated by actinic radiation and at least one organic additive which is substantially nonresponsive to free radicals and which is at least dispersable and preferably soluble in the elastomeric polymer, said composition having a viscosity less than about 30 Pascal-seconds at an application temperature of about 175° C. or less. A multifunctional cross-linking agent is preferably present during cure. The composition when cured has a glass transition temperature of from about −20° to about −100° C. The organic additive affects a property of the pressure-sensitive adhesive composition, particularly tack.

The improvement resides in the use of an elastomer which in combination with an organic additive provides a composition of low viscosity prior to cure and an organic additive which is substantially nonresponsive to the action of free radicals, as defined herein, while providing, upon cure, a pressure-sensitive adhesive composition having a glass transition temperature of at least 10° C., preferably at least 20° C. below use temperature.

Upon cure, the combination exhibits a positive change in properties such as desirable elevated temperature shear and oil resistance. This occurs at substantially lower levels of free radical generation than would have been required were the organic additive to consume a significant amount of free radicals.

While in terms of underprinted label manufacture, UV cure is advantageously used, EB cure chemical or thermal cure may also be employed. Polythiol cross-linkers are preferably used. Other cross-linkers may be used so long as premature cross-linking does not occur at hot melt processing temperatures.

DETAILED DESCRIPTION

The present invention is directed to compositions which utilize free radical cross-linking of unsaturated elastomeric polymers which are part of multicomponent compositions for application by hot melt techniques. When cured the elastomeric polymers are tackified or otherwise modified as to physical properties by addition of at least one organic additive which is substantially nonresponsive to the action of free radicals.

The compositions of the invention may be pressure-sensitive adhesives prior to cure, but in any event are pressure-sensitive adhesives following cure where properties are, in accordance with the present invention, enhanced by free radical cure. Free radicals are preferably generated by ultraviolet (UV) radiation with or without photoinitiators and/or photosensitizers. Other forms of actinic radiation, as well as electron beam radiation, may also be used. The invention also contemplates thermal enhancement of properties. An element of the compositions of the invention is a property modifying organic additive, typically a tackifier, which is substantially nonresponsive to the action of free radicals.

By the term "organic additive which is substantially nonresponsive to the action of free radicals" (organic additive herein) there is meant saturated or substantially saturated organic compounds and organic compounds which meet the criteria of, when blended with an unsaturated elastomeric polymer in proportions of about 40 parts by weight of the unsaturated elastomeric polymer and 60 parts by weight organic compound, will form a blend having a relative incipient gel dosage, i.e., the ratio of incipient gel dosage of the blend to the incipient gel dosage of the unsaturated elastomeric polymer, of no more than about 1.85, preferably 1.65. The measurement is made for a blend which is free of external cross-linking agents and for an EB radiation at 200 KV as illustrated in application Ser. No. 07/057,054.

For electron beam radiation, incipient gel dosage is determined as a minimum amount of electron beam (EB) dosage in kiloGray required to form a toluene insoluble gel. Insoluble gel is measured by placing 200 milligrams of a directly irradiated sample into 10 grams of toluene checking for the presence of insoluble material after 24 hours standing. Radiation is increased (or decreased) in increments of 10 kGy. If the solution appears clear upon visual inspection it is filtered through qualitative filter paper to check for the presence of gel. The procedure is repeated for each 10 kGy dosage level increment and the dosage at which gelation occurs is interpolated from the data. If a gel was not observed, for example, at 60 kGy, but was at 70 kGy, the value of incipient gel dosage is reported as 65 kGy. In each instance, the sample is coated from a toluene solution onto a release paper (50–75 g/m$^2$) and dried in an oven. The sample surface was directly exposed to EB radiation at 200 KV with inerting to 400 ppm $O_2$ or less. For values reported herein, the EB unit used was manufactured by Energy Sciences.

By the use of organic additives which are substantially nonresponsive to the action of free radicals, the energy required to achieve a level of cross-linking within the unsaturated elastomeric copolymer can remain unchanged and independent of organic additive concentration. In addition, as the additive approaches complete saturation, they facilitate formulation of low viscosity compositions adaptive to application by hot melt techniques.

For unsaturated compounds, saturation to a level sufficient to meet the definition can be achieved by hydrogenation or otherwise eliminating aromatic or aliphatic unsaturation with addition of groups which do not consume free radicals. In the alternative, saturated or partially hydrogenated organic compounds may be blended with saturated and/or highly saturated organic additives to achieve the desired result, namely a reduction of incipient dosage requirements to acceptable levels.

Stated another way, organic aromatic additives should effectively be at least 50% preferably at least 60% saturated namely aromatic unsaturation converted to aliphatic saturated for generally aliphatic hydrocarbons, at least 65% preferably 80% of unsaturated groups in the product as formed should be saturated or otherwise rendered nonresponsive to the action of free radicals. Complete saturation is preferred or at least saturation to a level where upon inclusion into the elastomer there will be a negligible additional consumption of free radicals over that required to achieve the same level of cure by cross-linking of the unsaturated elastomeric polymer. Some aromatic unsaturation is necessary for compatibility with butadiene containing elastomers which may be utilized in the present invention.

Organic additives which serve a tackifying function are normally present in a concentration ranging from about 40% to about 90% by weight, preferably from about 45% to about 85% by weight of the mixture of unsaturated elastomeric polymers and tackifying organic additives. Compositions containing less than about 40% by weight of an organic additive typically upon cure do not have sufficient "quickstick" or initial grab, and compositions having too high a tackifying organic additive have too low a cohesive strength even when cross-linked.

As examples of organic additives which are substantially nonresponsive to free radicals there may be mentioned hydrogenated organic compounds, such as hydrogenated aromatic resins including hydrogenated polystyrene, polyalpha-methyl styrene, polyvinyl toluene, copolymers of styrene with other monomers and the like, hydrogenated aliphatic resins derived from petroleum based products; highly hydrogenated rosins and rosin esters; hydrogenated white oil, mineral oil and the like.

As specific tackifiers employed in the practice of the invention there may be mentioned hydrogenated styrene based resins such as Regalrez TM resins designated as 1018, 1033, 1065, 1078, 1094 and 1126 manufactured and sold by Hercules Inc.; Regalrez TM 6108 a 60% hydrogenated aromatic resin, also manufactured by Hercules; hydrogenated $C_5$ and/or $C_9$ hydrocarbon feed stocks such as Arkon TM P-70, P-90, P-100, P-125, P115, M-90, M-100, M-110 and M-120 resins manufactured and sold by Arakawa Chemical and Regalite TM R-100, MGB-63, MGB-67, MGB-70, resins manufactured and sold by Hercules Inc.; hydrogenated Polycyclo-pentadienes such as Escorez TM 5320, 5300 and 5380 resins manufactured and sold by Exxon Chemical, hydrogenated polyterpene and other naturally occurring resins such as Clearon TM P-105, P-115, P-125, M-105, M-115 manufactured and sold by Yasuhara Yushi Kogyo Co. Ltd. of Japan and Eastotack TM H-100, H-115 and H-130 resins manufactured and sold by Eastman Chemical and the like. Tackifiers are materials accepted to have a glass transition temperature greater than the elastomers they tackify and are soluble in the diene portion of the elastomer.

Kaydol TM hydrogenated mineral oil manufactured and sold by Witco Chemical and the like may be added as a plasticizer. Plasticizers are available in both the diene and arene segments of the polymer and have a glass transition temperature greater than the glass transition temperature of the polymer.

The second component of the composition of the invention are unsaturated natural and synthetic elastomeric polymers including, but not limited to, block, random or multiarmed copolymers and mixtures thereof.

The elastomeric polymers employed contain a sufficient amount of low molecular weight constituents such that the combination has a viscosity at an application in temperature of about 175° C. of less than about 30 Pascal-seconds (Pa.S), preferably less than about 20 Pa.S, more preferably less approximately than about 15 Pa.S. The 175° C. limit is the temperature at which thermal degradation will generally begin.

Among the useful unsaturated elastomeric polymers there may be mentioned natural rubber, polybutadiene, polyisoprene, butyl rubber, ethylene propylene diene rubbers, styrene-butadiene block copolymers, styrene-butadiene-styrene block copolymers, styrene-isoprene block copolymers, styrene-isoprene-styrene block copolymers, multiarmed styrene-isoprene block copolymers and the like. Useful unsaturated elastomeric polymers are also disclosed in U.S. Pat. No. 4,556,464 to St. Clair incorporated herein by reference.

Preferably, the elastomeric block polymers to which the invention is directed are ABA block, AB block copolymers and mixtures thereof, and wherein A is a block comprising at least one monoalkenyl arene, preferably styrene, alpha methyl styrene, vinyl toluene and the like, and B is an elastomeric conjugated diene block such as a polybutadiene or a polyisoprene block with polyisoprene blocks preferred. It is required that a sufficient lower molecular weight AB block copolymers be present to enable formation of the low viscosity adhesive compositions of the invention.

Most preferably, the elastomeric copolymers are formed of mixture of styrene-isoprene-styrene and styrene isoprene block copolymers such as Kraton D-1112 and D-1117 manufactured by Shell and styrene-butadiene block copolymers, such as Solprene 1205. Kraton D-1117 with high levels of styrene-isoprene diblocks is most preferred. There may be advantageously used arene end block reinforcing resins, such as the Endex line of resins manufactured by Hercules Inc., which may be present in amounts up to about 15 percent by weight or more.

The compositions are adaptive to application to a substrate such a printed or an inked surface by hot melt techniques including coating or printing. The coating is then free radical cross-linked preferably using UV radiation, with or without a photoinitiator, or photosensitizer. Electron beam (EB) and thermal cure may also be employed. There is formed pressure-sensitive adhesives of excellent oil resistance and elevated temperature properties.

Cross-linking is benefit by the use of external cross-linkers. External cross-linkers are multifunctional monomers preferably polythiols. Polythiol cross-linkers, for instance, are functional at concentrations of about 10% or less by weight of the total composition. The polythiol cross-linkers include for instance, pentaerythritol-tetrathioglycolate, pentaerythritol-tetra (3-mercaptopropionate), trimethylolethanetrimercaptopropionate, trimethylolpropanetrithioglycolate, trimethylolpropane tri (3-mercaptopropionate) and the like. Multifunctional acrylates and methacrylates may also be used, but are thermally reactive and if employed, the process temperature must be kept sufficiently low to prevent premature cross-linking. There may also be used halogenated hydrocarbons as cross-linking agents such as hexabromocyclododecane, tetrabromo-bis-phenol A (allyl ether), 1,2-dibromoethyl-3,4-dibromocylohexane, clorinated polyethylene and the like.

The uncured base copolymers are not because of viscosity consideration pressure-sensitive adhesives as formulated but form pressure-sensitive adhesive upon cure in the presence of tackifiers.

To be functional as a pressure-sensitive adhesive the composition must upon cure have at least one glass transition temperature at least about 10° C. below use temperature, preferably at least 20° C. below use temperature.

The following Examples are designed to illustrate the instant invention.

EXAMPLE 1 and 2

The base unsaturated elastomeric polymers used were a mixture of linear styrene-isoprene-styrene (SIS) and styrene-isoprene (SI) block copolymers known as Kraton ™ D-1117 manufactured and sold by Shell Chemical Company. The tackifying organic additives was Regalrez ™ 1078, a saturated hydrocarbon manufactured by Hercules Inc. There was also employed Endex ™ 155 manufactured by Hercules Inc., an aromatic endblock reinforcing resin compatible with the polystyrene phase of the block copolymers. The specific formulation are shown below:

| Parts | Component |
|---|---|
| | Example 1 |
| 35 | Kraton D-1117 |
| 10 | Endex 155 |
| 55 | Regalrez 1078 |
| 2.0 | Antioxidant |
| 1.0 | Benzophenone |
| 1.0 | Trimethylopropane trithioglycolate | melt viscosity = 11 Pa.S @ 175° C.

| Parts | Component |
|---|---|
| | Example 2 |
| 35 | Kraton D-1117 |
| 10 | Endex 155 |
| 55 | Regalrez 1078 |
| 2.0 | Antioxidant |
| 1.95 | Photoinitiator |
| 1.0 | Trimethylolpropane trithioglycolate |
| 15 | Dupont R-900, $TiO_2$ (filler) | melt viscosity = 15-16 Pa.S @ 175° C.

The formulation of Example 1 was a hot melt version of a solution cast adhesive which without cross-linker, and at a coat weight of 55 g/m², gave the properties which are shown as Table 1.

| | |
|---|---|
| Looptack, N/m | 2310 |
| 180° peel, N/m | 1450 |
| 2.5 kg RTS[a], ks | 116 |
| 70° C. ETS[b], ks | 26.8 |

[a] Room Temperature Shear in kiloseconds for 0.5" × 0.5" dead soft Al facestock;
[b] Elevated Temperature Shear in kiloseconds for 1" × 1" Al facestock.

The composition of Example 1 was UV cured at about 1 J.cm$^{-2}$, and 180° peel was measured before and after immersion in Pennzoil SAE-30 motor oil for 4 hours at 121° C. The results are shown in Table 1.

TABLE 1

| | 180° peel (N/m) |
|---|---|
| before oil test | 1380 |
| after oil test | 2530 |

For Example 2, oil resistance (evaluated by 180° peel and edge penetration) were measured for uncured samples and samples cured at about 1.0 J.cm$^{-2}$). 180° peel values are shown in Table 2. In the oil penetration tests (4 hours at 250° F.), the cured composition of Example 2 when used to bond mylar to Stainless Steel gave no penetration and a 1/32" edge penetration for glass-filled polypropylene.

TABLE 2

| Sample | Test Conditions | 180° peel (N/m) |
|---|---|---|
| Example 2, uncured | — | 880 |
| Example 2, 1.0 J.cm$^{-2}$ | — | 850 |
| Example 2, 1.0 J.cm$^{-2}$ | 121° C. oil | 1400 |

In the above, 180° Peel in Newtons per Meter (N/m) were determined using PSTC-1 at 20 minute dwell. Loop tack was measured by forming a loop from a 1 inch by 8 inch strip, adhesive face out, inserted in the jaws of an Instron tester and moving the loop at the rate of 12 inches per minute onto a stainless steel panel, then removing the strip at the rate of 12 inches per minute as soon as one square inch of contact is made.

What is claimed is:

1. A pressure-sensitive adhesive which comprises a free radical cured product formed of a mixture comprising, based on the weight of the mixture, from about 15 to about 60 parts by weight of an unsaturated elastomer polymer component comprising a mixture of styrene-isoprene block copolymers and styrene-isoprene-styrene block copolymers, from about 85 to about 40 parts by weight of a tackifying organic hydrogenated styrene based resin additive which is substantially non-responsive to the action of free radicals is at least 50% saturated, in admixture with an effective amount up to 15 parts by weight of a reinforcing resin for the polystyrene end block of the elastomer resin and from 0 to about 10 by weight parts of a polythiol cross-linking agent, said cured pressure-sensitive adhesive having a glass transition temperature of at least 10° C. below use temperature and a viscosity of less than about 30 Pascal-seconds at a hot melt application temperature of less than about 175° C., said mixture in a proportion of 40 parts by weight copolymer and 60 parts by weight organic additive has the relative incipient gel dosage at cure of about no more than 1.65 at an electron beam radiation level of 200 kv.

* * * * *

UNITED STATES PATENT AND TRADEMARK OFFICE
CERTIFICATE OF CORRECTION

PATENT NO. : 5,093,406
DATED : March 3, 1992
INVENTOR(S) : Kevin S. Lossner; Yukihiko Sasaki It is certified that error appears in the above-identified patent and that said Letters Patent is hereby corrected as shown below:

On the Title Page:

Abstract, line 6, change "thr" to -- the --.

Column 4, line 5, change "Regalrez TM" to -- Regalrez™ --.
Column 4, line 7, change "Regalrez TM" to -- Regalrez™ --.
Column 4, line 10, change "Arkon TM" to -- Arkon™ --.
Column 4, line 11, change "P115" to -- P-115 --.
Column 4, line 12, change "Regalite TM" to -- Regalite™ --.
Column 4, line 14, change "Polycyclo-pendienes" to
    -- polycyclo-pendienes --.
Column 4, line 15, change "Escorez TM" to -- Escorez™ --.
Column 4, line 18, change "Clearon TM" to -- Clearon™ --.
Column 4, line 20, change "Eastotack TM" to -- Eastotack™ --.
Column 4, line 26, change "Kaydol TM" to -- Kaydol™ --.
Column 4, line 67, change "mixture" to -- mixtures --.

Column 5, line 10, after "such" insert -- as --.
Column 5, line 18, change "benefit" to -- benefitted --.
Column 5, lines 35,36, change "clorinated" to
    -- chlorinated --.
Column 5, line 49, change "EXAMPLE" to -- EXAMPLES --.
Column 5, line 53, change "Kraton TM" to -- Kraton™ --.
Column 5, line 55, change "additives" to -- additive --.
Column 5, line 55, change "Regalrez TM" to -- Regalrez™ --.
Column 5, line 57, change "Endex TM" to -- Endex™ --.
Column 5, line 60, change "formulation" to
    -- formulations --.

UNITED STATES PATENT AND TRADEMARK OFFICE
CERTIFICATE OF CORRECTION

PATENT NO.  : 5,093,406

DATED       : March 3, 1992

INVENTOR(S) : Kevin S. Lossner; Yukihiko Sasaki

It is certified that error appears in the above-identified patent and that said Letters Patent is hereby corrected as shown below:

Column 7, line 5, change "by weight parts" to
         -- parts by weight --.

Signed and Sealed this

Nineteenth Day of October, 1993

Attest:

BRUCE LEHMAN

Attesting Officer        Commissioner of Patents and Trademarks